April 5, 1966     O. A. PETERSON     3,243,941
CENTRIFUGAL SEPARATOR
Original Filed June 14, 1962
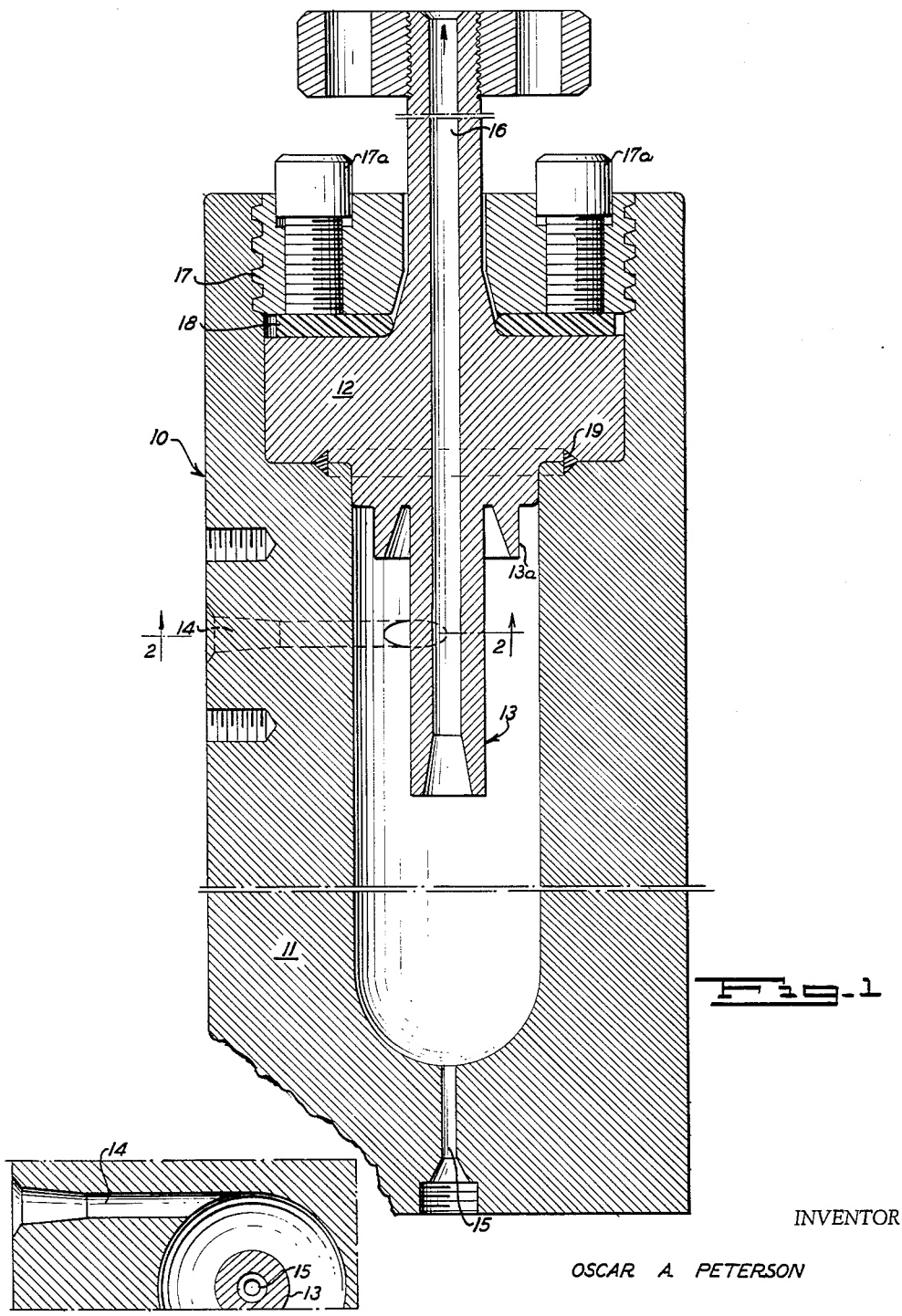
INVENTOR
OSCAR A. PETERSON
BY *William C. Long*
ATTORNEY

3,243,941
CENTRIFUGAL SEPARATOR
Oscar A. Peterson, Washington Township, Westwood, N.J., assignor to Halcon International, Inc., a corporation of Delaware
Original application June 14, 1962, Ser. No. 202,588. Divided and this application Apr. 22, 1965, Ser. No. 453,869
5 Claims. (Cl. 55—204)

This application is a division of application Serial No. 202,588, filed June 14, 1962, and now abandoned.

This invention relates to a centrifugal separator for use in separation of mixtures of gases and liquids under elevated pressure conditions. More particularly it relates to such apparatus which comprises a thick walled separation vessel having a bottom and sides, a top part adapted to seal the vessel and including as an integral part thereof a vapor outlet pipe around which the feed is directed tangentially to provide a centrifugal separation, a baffle arranged about said vapor outlet pipe to divert liquid away from said outlet pipe, and an annular retaining ring adapted to hold the top part in place.

High pressure separators or knock-out pots are used in many commercial processes and they may be made up in several known ways. The separator chamber may be in the form of a cylinder, cone or other round walled configuration. The gas-liquid mixture may be fed near or at the top thereof, and after centrifugal separation, the gas may be removed via an appropriate opening near the top, and the liquid may be removed via an appropriate opening near or at the bottom thereof.

Often the separator must be serviced, cleaned or otherwise disassembled for maintenance. It is therefore desirable to provide a unit which will permit easy access to the inside of the separator during maintenance periods.

The heretofore proposed separator has a seal at the bottom necessitating the dismounting and inverting of the unit for servicing. In addition, the vapor outlet pipe about which the gas-liquid mixture is centrifugally directed has been screwed into place and has often vibrated loose. The art is confronted with the problem of providing high pressure, efficient knock-out vessels which do not require complicated and costly servicing, which are tightly sealed and which have a vapor outlet pipe which cannot loosen due to vibration.

Another problem which has plagued the designers and users of knock-out vessels is the by-passing of liquid into the vapor outlet. In heretofore known devices liquid impinged upon the walls of the separator by centrifugal action and forced upwards by the movement of the feed, has wet the vapor outlet pipe and eventually passed into the pipe with the exiting gases. The efficiency of the separator has thusly been reduced.

These problems have been solved by using a separator comprising three parts: (1) a thick walled vessel, having a bottom and sides, having feed means in a side thereof adapted to pass feed into the separator in a tangential manner and having liquid outlet means near the bottom thereof; (2) a one-piece top part adapted to rigidly seal the vessel which includes the features of a solid body, a vapor outlet pipe depending from the body into the separator to a point below the feed means in said vessel so as to aid the separation of liquid and vapor, and a baffle arranged about the vapor outlet pipe so as to divert liquid impinged upon the wall of the vessel away from said outlet pipe; and (3) an annular retaining ring adapted to threadly engage the upper portions of the sides of said vessel and hold in place said top part.

In the accompanying drawings, FIGURE 1 is a cross sectional view of a separator in accordance with the invention.

Referring to FIGURE 1, the high pressure separator 10 is comprised of three parts. The first part is a vessel 11 which consists of a bottom and sides. It may be made of steel or other suitably strong material. The vessel contains feed inlet means 14 adapted to pass feed into the vessel in a tangential manner and liquid outlet means 15 adapted to remove liquid. The second part is the top section which is in one solid piece and consists of a solid body 12, vapor outlet pipe 13 which extends down and into the separator chamber bounded by the walls of the vessel 11 to a point below the feed inlet to the separator, and baffle 13a which is arranged concentrically about vapor outlet pipe 13. Liquid which impinges upon the walls of the separator and moves up the wall is kept from wetting vapor outlet pipe 13 by baffle 13a. The top part seals the separator by resting in the recesses provided in the walls of the vessel and engaging gaskets 19. The third part is retaining ring 17 which threadably engages the walls of the vessel. The retaining ring can be turned by means of bolts 17a so as to press against the top part and seal it against the vessel. A gasket 18 may be provided between the retaining ring and the top part.

To facilitate removal of the top part for purposes of cleaning or maintenance it may be provided with a handle or other equivalent means.

FIGURE 2 is a top view of the apparatus.

An apparatus as disclosed herein presents minimized maintenance problems. Because of its unique construction it is most satisfactory for high pressure service and neither the vapor outlet pipe nor the baffle can vibrate loose during operation.

In view of this disclosure, variations and modifications of the invention will be apparent to one skilled in the art. It is intended to include within the invention all such modifications except as do not come within the scope of the appended claims.

What is claimed is:

1. A high-pressure, gas-liquid separator comprising three parts: a thick walled vessel, having a bottom, an inside wall and sides, having thread means on the upper portion of said inside wall having feed means in a side thereof adapted to pass feed into the separator in a tangential manner, and having liquid outlet means in the bottom thereof; a one-piece top part adapted to rigidly seal the vessel which includes the features of a solid body, a vapor outlet pipe depending from said body into said separator to a point below the feed means in said vessel, and a baffle arranged about the vapor outlet pipe so as to divert liquid impinged upon the wall of the vessel away from said outlet pipe; and a threaded annular retaining ring adapted to threadably engage said upper portion of the inside wall of said vessel and hold in place said top part.

2. A high-pressure gas-liquid separator as defined in claim 1 wherein the inside wall of said vessel adjacent the top is recessed so as to engage the top part and thereby form a tight seal.

3. A high-pressure, gas-liquid separator as recited in claim 2 wherein said recess contains a gasket in a horizontal portion thereof.

4. A high-pressure, gas-liquid separator as recited in claim 1 wherein said top part extends above said retaining ring and is provided with handle means to facilitate removal of said top part.

5. A high-pressure, gas-liquid separator as recited in claim 1 wherein said baffle is arranged concentrically around said vapor outlet pipe.

References Cited by the Examiner

UNITED STATES PATENTS

| | | | |
|---|---|---|---|
| 1,531,602 | 3/1925 | Folker | 55—459 |
| 1,938,849 | 12/1933 | Maxim et al. | 55—238 |
| 2,757,582 | 8/1956 | Freemal et al. | 55—191 |
| 2,816,658 | 12/1957 | Braun et al. | 55—435 |
| 2,840,240 | 6/1958 | Snyder | 211—512 |
| 2,845,138 | 7/1958 | Gageby | 55—387 |
| 2,952,330 | 9/1960 | Winslow | 55—202 |
| 3,067,876 | 12/1962 | Huvby | 210—512 |
| 3,161,490 | 12/1964 | Dudek | 55—205 |

REUBEN FRIEDMAN, *Primary Examiner.*